Aug. 16, 1932.  W. R. MARTIN  1,872,087
TENSION INDICATOR
Filed May 26, 1928  3 Sheets-Sheet 1
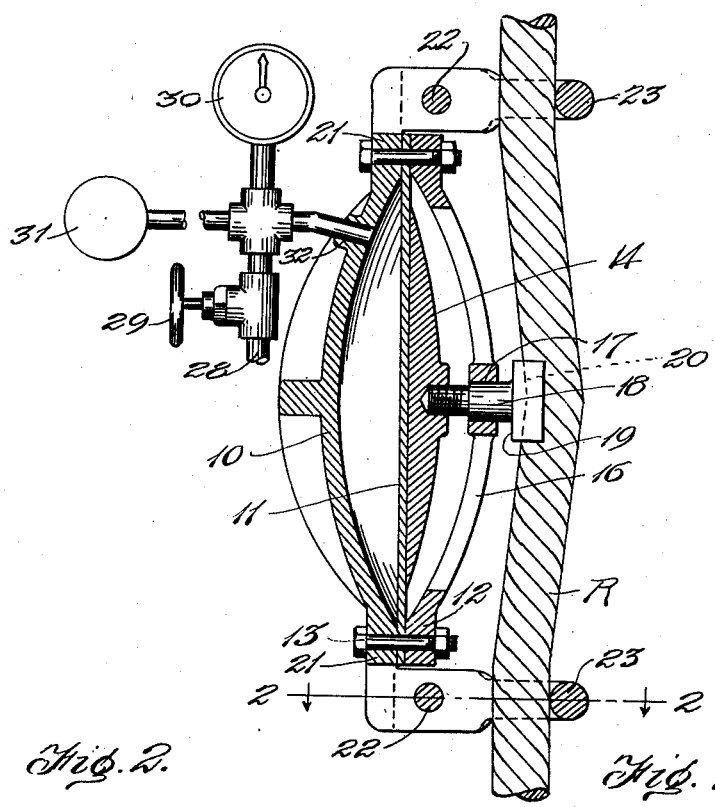
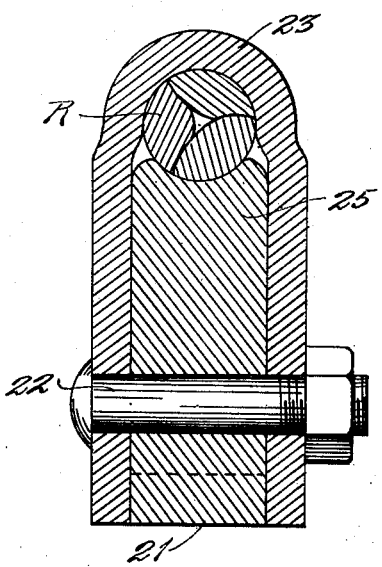
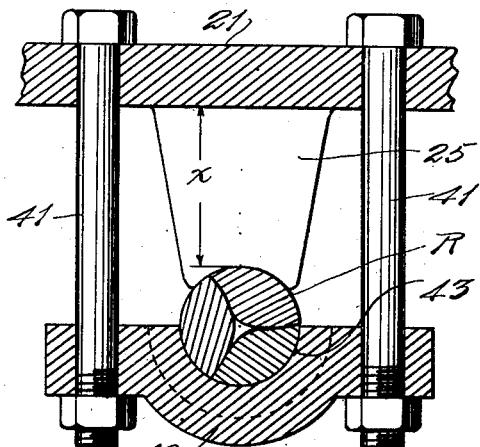
INVENTOR.
Walter R. Martin,
BY
ATTORNEYS.

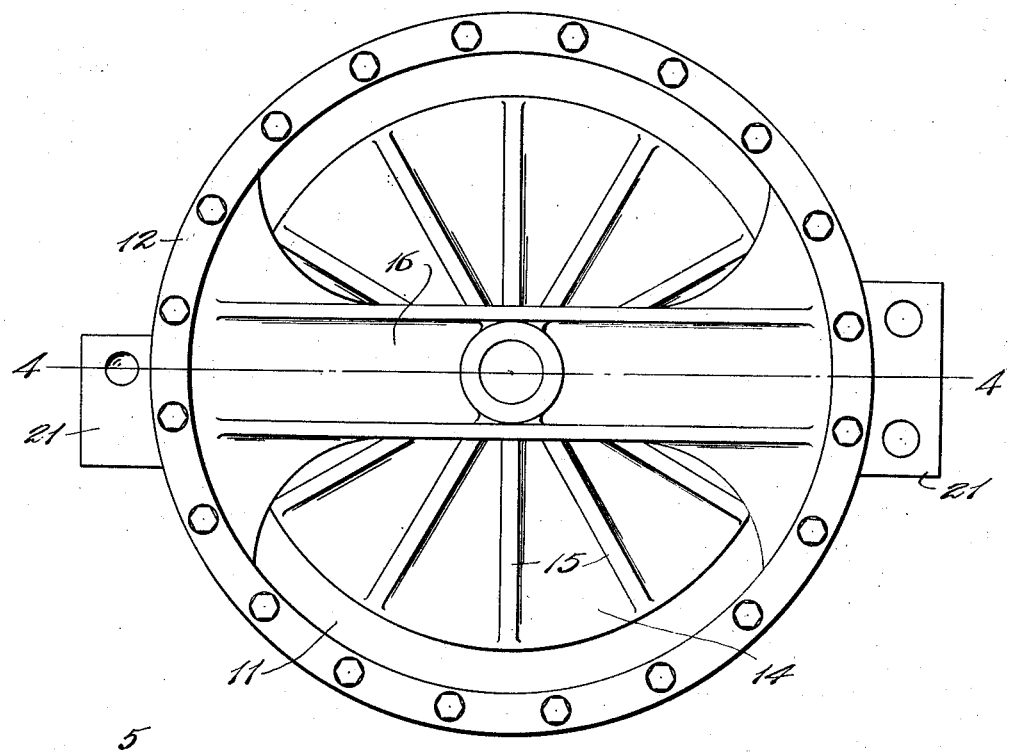
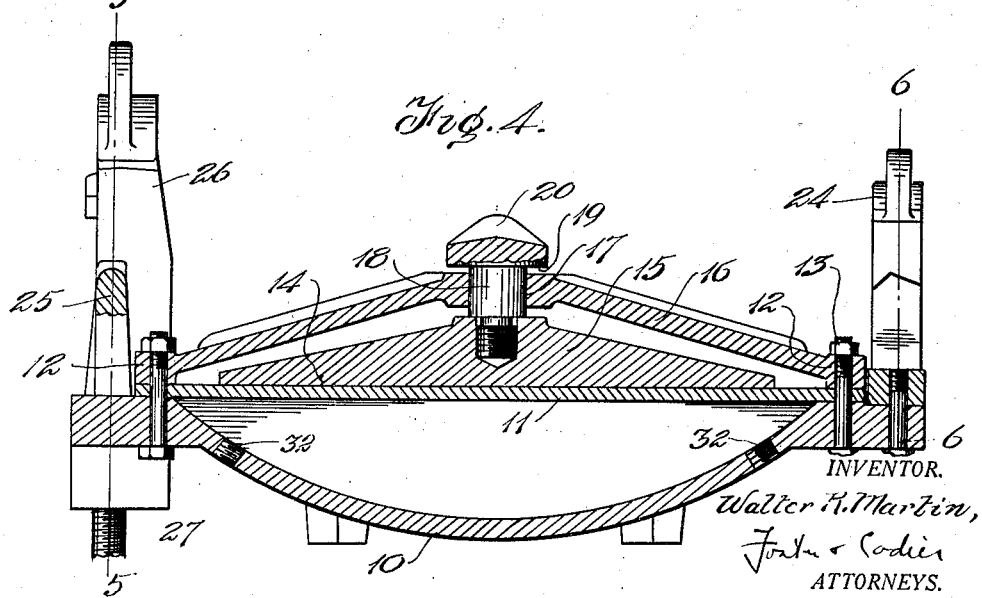

Aug. 16, 1932. W. R. MARTIN 1,872,087
TENSION INDICATOR
Filed May 26, 1928 3 Sheets-Sheet 3
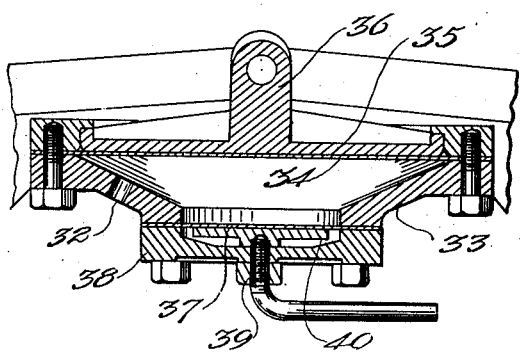
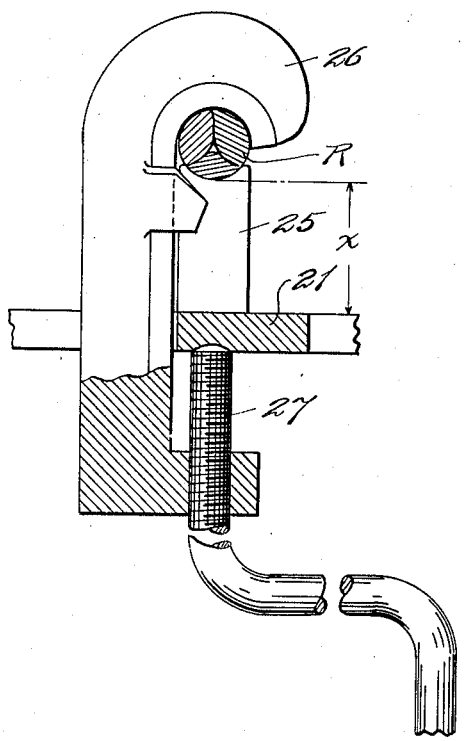
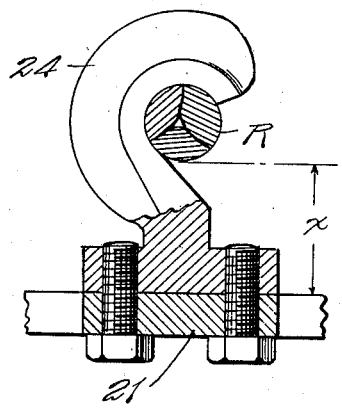
INVENTOR.
Walter R. Martin,
BY Foster + Cocher
ATTORNEYS.

Patented Aug. 16, 1932

1,872,087

UNITED STATES PATENT OFFICE

WALTER R. MARTIN, OF LONG BEACH, CALIFORNIA, ASSIGNOR TO MARTIN-DECKER CORPORATION, OF LONG BEACH, CALIFORNIA, A CORPORATION OF DELAWARE

TENSION INDICATOR

Application filed May 26, 1928. Serial No. 280,928.

This invention relates to portable tension indicators and has special reference to such an indicator as is shown in my copending application for automatic weigher and drill string pressure recording device, filed November 1, 1926, and bearing the Serial No. 145,683, and eventuating in Patent No. 1,771,340, dated July 22, 1930, the present application forming a continuation in part of the aforesaid application.

One important object of the present invention is to provide an improved form of fluid pressure cell for use in connection with tension indicators.

A second important object of the invention is to provide such a cell having means associated therewith whereby the volumetric capacity of the cell may be regulated, so that the pressure gauge employed in connection with the cell to indicate pressures therein may be accurately set to zero as desired.

In cells of this character very considerable pressures very often exist. The cells forming the subject of this application are all equipped with yieldable diaphragms. Such heavy pressures are apt to over stress the diaphragm and produce permanent strain therein, thus preventing accurate indications by the device. A third important object of the invention is to provide means for limiting the movement of the diaphragm under either excessive or deficient pressures.

A fourth important object of the invention is to provide means to insure, for a definite size of rope, a definite and fixed deflection, so that the stress which produces this deflection can be accurately measured; it being well understood that the force which is required to produce a certain deflection in a rope under tension, such deflection being confined to a given length of rope, is much less than that required to produce double the deflection under the same tension and length conditions; in other words, while the force required to produce a given deflection varies directly as the tensile stress under which the rope is used. The extent of deflection varies.

It is a further object to provide a tension indicator which readily lends itself for application to the constantly vibrating "dead end" of a cable upon which it is mounted while preventing the setting up of objectionable sympathetic vibration of the instrument attended with forces tending to disturb the center of gravity of its mass, and thus imposing undesirable strain upon the responsive parts of the instrument and excess inertia of the fluid.

It is also a desirable object of the invention to so mount and guide the moving element of the device as to prevent buckling of the diaphragm and binding of the parts.

With the above and other purposes in view, the invention consists in general of certain novel details of construction and combinations of parts, and whereas all elements hereinafter fully described are illustrated in the accompanying drawings and specifically claimed. In the accompanying drawings like characters of reference indicate like parts in the several views, and:—

Figure 1 is a section taken diametrically through one form of the device as set forth in my copending application.

Figure 2 is a detailed section of one of the rope grips, the view being taken on the line 2—2 of Figure 1.

Figure 3 is a view of one side of a second form of the device with the rope engaging hooks omitted.

Figure 4 is a section on the line 4—4 of Figure 3 with the rope engaging hooks in position.

Figure 5 is an enlarged detail section on the line 5—5 of Figure 4.

Figure 6 is an enlarged section on the line 6—6 of Figure 4.

Figure 7 is a section similar to Figure 6 but showing a modified form of rope clamp.

Figure 8 is a section similar to Figure 1 but showing a modified form of means for adjusting the volumetric content of the cell.

In the forms of the device shown in Figures 1, 3 and 4 there is provided a fluid pressure cell having a rigid hollow lenticular body member 10 across the open side on which extends a flexible diaphragm 11 which is secured to the body member around the periphery by a ring 12 fixed to the body 10 by bolts 13. Resting on the outside of the diaphragm 11 is a pressure plate 14 which may be provided with suitable ribs 15 to render the plate rigid. Bridging over this plate by the diametrical portions of the ring 12, which practically forms part of the body, is a bridge member 16 having a central opening 17 wherethrough passes slidably a strut member 18 which is screwed into the plate 14 on its outside and firmly fixed thereto. The outer end of this strut member is provided with a shoulder 19 so that movement inwardly of the diaphragm is limited by the engagement of this shoulder with the bridge 16, while outward movement of the diaphragm is limited by the engagement of the central portion of the plate 14 with the bridge. This strut 18 is provided on its outer end with a rope engaging groove 20. Projecting from diametrically opposite points of the body 10 are lugs 21, and in the form shown in Figure 1 each of these lugs is secured thereto by a bolt 22 and a rope engaging loop 23, which thus secures the rope R to the cell at diametrically spaced points, the strut 18 engaging the rope centrally between these points to produce the necessary deflection therein, as can clearly be seen by reference to Figure 1. In the form shown in Figure 4 there is secured to one of the lugs 21 a fixed hook 24 and projecting from the other lug is a stop or spacing member 25 arranged to engage the rope on the same side as the strut and opposite its engagement with the hook 24. On the side of the cell carrying the member 25 is a movable hook 26 which is adjusted to draw the rope towards and from the cell by a crank handled screw 27, but it is to be observed that the stop 25 limits the movement of the rope towards the cell, so that with a rope on the device shown in Figure 4 the deflection, for the proper sized rope for which the device is intended, is always the same under a given pressure within the cell.

In the form of the device shown in Figure 1 fluid is supplied to the cell under pressure through a pipe 28 provided with a valve 29 and connected to the pipe is a pressure indicating gauge 30. A recording gauge 31 may also be connected to the pipe. This arrangement is typical and the remaining forms of the device are also tapped as at 32 for the reception of gauge connections. The pipe 28 is connected to a pump (not shown) so that the pressure within the cell may be regulated and thus the volumetric content of the cell be varied in such manner that the gauge may be brought to zero as desired.

In the form of the invention shown in Figure 8 the body 33 is open on both sides, the usual diaphragm 34 and pressure plate 35 with its strut 36 being employed. Closing the other side of the body 33 is a second diaphragm 37 which is held in position by a cover plate 38 through which passes an adjusting screw 39 bearing against a pressure plate 40, so that by the adjustment of the screw 39 the volumetric content of the cell may be varied. It will be observed in Figure 8 the hooks for holding the rope are omitted, since the view is intended merely to show a second method of varying the size of the cell.

In some instances, especially where larger ropes are used, the hooks may be replaced by a pair of bolts 41 carrying a yoke 42, grooved as at 43 to receive the rope R, as shown in Figure 7.

Attention is particularly directed to the special advantages obtained by the design and construction of the weight indicator here shown for the problems which must be solved in applying a weight indicator to a cable for supporting a drill string are entirely different than those concerned with the measurement of static force as involved in objects standing practically at rest. In the present case a drill string supporting cable may have loans of enormous weight imposed upon it and of such magnitude that any ordinary type of weight indicator would not accommodate it and measure it. It has been this reason that has caused the design of the present device, having a relatively large diameter, shallow fluid container across one side of which is a diaphragm of relatively large diameter. The shape of the fluid container thus provides a structure of enormous strength to withstand the strains imposed upon it and the pressure of the fluid within it, while the diaphragm being of relatively large diameter and area is responsive to slight variation in pressures of enormous force without being subject to excessive strain. The present structure is also designed to lie flat in a plane parallel to the supporting cable and quite close thereto, so that as the cable vibrates the mass of the fluid container and its contents will not be off center in any amount appreciable to cause increased inertia forces to be set up in the instrument whereby an erroneous reading would be obtained.

My invention also provides a central mounting and guide for the pressure plate, which mounting is disposed close to the line, and provides a relatively short bearing guide which will tend to center the plate without offering material resistance to its normal limited range of universal movement. In this regard attention is called to the fact that the pressure plate contacts with the flexible diaphragm and that this diaphragm has sufficient inherent stability to normally maintain the pressure plate in a properly aligned position parallel to the longitudinal center of the cable upon which the structure is mounted, and will at the same time permit the plate to have limited lateral movement as may be caused by forces upon the center contact of the weight indicator, and which are not centrally directed, and as the forces vary upon the cable due to vibration, excessive weight, longitudinal movement, or during application of the device to the line.

In the operation of weight indicators which carry relatively heavy loads it is desirable that the structure shall be substantially non-yielding so that it will resist the pressure of the fluid and will therefore insure great accuracy in the reading obtained. In the present invention this has been accomplished by the provision of a cell within which the fluid is confined and which cell is of relatively large diameter while being shallow, giving it great rigidity, the opposite side of the cell being a diaphragm reinforced throughout its entire area save a relatively narrow margin by a non-yielding pressure plate. This provides a substantially rigid container for fluid under pressure in contrast to the lack of rigidity of sylphons and other types of fluid pressure.

In operation the device is applied to a rope in the position shown in Figure 1 and the tension of the rope is readable in terms of pressure on the pressure gauge, the latter being either calibrated to indicate tension in units of weight directly or by calibration in units of pressure, suitable tables being used to transpose the pressure reading to pounds load on the rope.

It is to be understood that by the term "rope" as used throughout the present case there is meant any flexible tension element, such as fibre or wire rope or cords, plain or twisted wires, chains, straps and other like devices.

There has thus been provided a simple and efficient device of the kind described and for the purpose specified.

It is obvious that many minor modifications may be made in the form and construction of the invention without departing from the material principles involved. It is not therefore desired to confine the invention to the exact forms herein shown and described, but it is wished to include all such as properly come within the scope claimed.

Having thus described the invention, what is claimed as new, is:—

1. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at spaced points and arranged to engage a rope on one side thereof, a third rope engaging and deflecting member carried by the presser plate and engaging the opposite side of the rope between the first rope engaging members, and means independent of said closure for controlling the capacity of the cell and deflecting the closure to a predetermined position.

2. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, and stop means for positioning the rope in fixed spaced relation to the rigid body of the cell.

3. In a tension measuring device, a fluid pressure cell including a rigid hollow body forming one side of the cell and yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, stop means for positioning the rope in fixed spaced relation to the rigid body of the cell, and means independent of said closure for controlling the capacity of the cell and deflecting the closure to a predetermined position.

4. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, and means carried by the rigid member and limiting the movement of said plate and closure.

5. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, stop means for positioning the rope in fixed spaced relation to the rigid body of the cell, and means carried by the rigid member and limiting the movement of said plate and closure.

6. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, means independent of said closure for controlling the capacity of the cell and deflecting the closure to a predetermined position, stop means for positioning the rope in fixed spaced relation to the rigid body of the cell, and means carried by the rigid member and limiting the movement of said plate and closure.

7. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, and a bridge member having its ends fixed to the rigid cell member and bridging over the closure and plate, said bridge member having an opening therein through which said third rope engaging member passes, said third member being shouldered to limit its movement in one direction and the plate engaging the inner side of the yoke to limit movement of the third member in the opposite direction whereby the movement of the plate and closure is limited in both directions.

8. In a tension measuring device, a fluid pressure cell including a rigid hollow body forming one side of the cell and a yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, means independent of said closure for controlling the capacity of the cell and deflecting the closure to a predetermined position, and a bridge member having its ends fixed to the rigid cell member and bridging over the closure and plate, said bridge member having an opening therein through which said third rope engaging member passes, said third member being shouldered to limit its movement in one direction and the plate engaging the inner side of the yoke to limit movement of the third member in the opposite direction whereby the movement of the plate and closure is limited in both directions.

9. In a tension measuring device, a fluid pressure cell including a rigid hollow body forming one side of the cell and a yieldable closure for the other side of said cell, a presser plate resting on the outside of said closure, a pair or rope engaging members carried by the rigid member of the cell at diametrically spaced points and arranged to engage a rope on one side thereof, a third rope engaging and deflecting member carried by the presser plate and engaging the opposite side of the rope between the first rope engaging members, stop means for positioning the rope in fixed spaced relation to the rigid body of the cell, and a bridge member having its ends fixed to the rigid cell member and bridging over the closure and plate, said bridge member having an opening therein through which said third rope engaging member passes, said third member being shouldered to limit its movement in one direction and the plate engaging the inner side of the yoke to limit movement of the third member in the opposite direction whereby the movement of the plate and closure is limited in both directions.

10. In a tension measuring device, a fluid pressure cell including a rigid hollow body forming one side of the cell and yieldable closure for the other side of said cell, a presser plate resting on the outside of said closure, a pair of rope engaging members carried by the rigid member of the cell at diametrically spaced points and arranged to engage a rope on one side thereof, a third rope engaging and deflecting member carried by the presser plate and engaging the opposite side of the rope between the first rope engaging members, means independent of said closure for controlling the capacity of the cell and deflecting the closure to a predetermined position, stop means for positioning the rope in fixed spaced relation to the rigid body of the cell, and a bridge member having its ends fixed to the rigid cell member and bridging over the closure and plate, said bridge member having an opening therein through which said third rope engaging member passes, said third member being shouldered to limit its movement in one direction and the plate engaging the inner side of the yoke to limit movement of the third member in the opposite direction whereby the movement of the plate and closure is limited in both directions.

11. In a tension measuring device, a fluid pressure cell including a rigid hollow body forming one side of the cell and a yieldable diaphragm constituting a closure for the other side of said cell, a pressure plate resting on the outside of said diaphragm, a fixed rope hook carried by the body and projecting parallel to the axis of the cell on the diaphragm side thereof, a similarly projecting hook disposed diametrically of the cell in relation to the first hook, means to adjust the second hook to move the rope engaged thereby toward and from the cell, a third rope engaging member projecting centrally from the pressure plate and forming a strut to deflect the rope between the hooks, and a second strut fixed to the rigid body in opposition to the second hook to limit movement of the rope toward the cell.

12. In a tension measuring device, a fluid pressure cell including a rigid hollow body forming one side of the cell and a yieldable diaphragm constituting a closure for the other side of said cell, a pressure plate resting on the outside of said diaphragm, a fixed rope hook carried by the body and projecting parallel to the axis of the cell on the diaphragm side thereof, a similarly projecting hook disposed diametrically of the cell in relation to the first hook, means to adjust the second hook to move the rope engaged thereby toward and from the cell, a third rope engaging member projecting centrally from the pressure plate and forming a strut to deflect the rope between the hooks, a second strut fixed to the rigid body in opposition to the second hook to limit movement of the rope toward the cell, and means carried by the rigid member and limiting the movement of said plate and closure.

13. In a tension measuring device, a fluid pressure cell including a rigid hollow body forming one side of the cell and a yieldable diaphragm constituting a closure for the other side of said cell, a pressure plate resting on the outside of said diaphragm, a fixed rope hook carried by the body and projecting parallel to the axis of the cell on the diaphragm side thereof, a similarly projecting hook disposed diametrically of the cell in relation to the first hook, means to adjust the second hook to move the rope engaged thereby toward and from the cell, a third rope engaging member projecting centrally from the pressure plate and forming a strut to deflect the rope between the hooks, a second strut fixed to the rigid body in opposition to the second hook to limit movement of the rope toward the cell, and a bridge member having its ends fixed to the rigid cell member and bridging over the closure and plate, said bridge member having an opening therein through which said third rope engaging member passes, said third member being shouldered to limit its movement in one direction and the plate engaging the inner side of the yoke to limit movement of the third member in the opposite direction whereby the movement of the plate and closure is limited in both directions.

14. A device for measuring tension in a longitudinal member, comprising a rigid hollow body extending parallel to said longitudinal member, engaging means upon opposite sides of said rigid hollow body for engaging the longitudinal member, a yieldable wall structure extending across the mouth of said hollow body and acting to form a fluid pressure cell within said body, a pressure plate adapted to lie against said yieldable wall, and a tension member disposed centrally of said pressure plate and engaging the longitudinal member at a point intermediate the points of contact with the engaging members carried by the hollow body, whereby deflection of the longitudinal member will force the pressure plate against the yieldable wall and produce a proportional variation in the pressure of the fluid within the hollow body, said yieldable wall having sufficient inherent stability to support the pressure plate in a plane substantially parallel to the longitudinal axis of the longitudinal member.

15. In a tension measuring device, a fluid pressure cell, including a rigid hollow body extending parallel to a longitudinal member whose tension is to be measured, a pressure plate adapted to move laterally of the longitudinal member and being interposed between said member and the hollow body, a yieldable fluid confining wall interposed between said rigid member and said pressure plate, said yieldable fluid confining wall having inherent stability tending to resist movement of the pressure plate from a plane parallel to the longitudinal axis of the longitudinal member, a pair of engaging members carried by the rigid hollow member at spaced points on diametrically opposite sides thereof, a third engaging member carried by the pressure plate and engaging the longitudinal member at a point intermediate the points of contact with the pair of engaging members on the rigid hollow member, whereby variation in tension in the longitudinal member will be transmitted through the pressure plate to the fluid confined within the hollow member.

16. In a tension measuring device, a fluid pressure cell, including a rigid hollow body extending parallel to a longitudinal member whose tension is to be measured, a pressure plate adapted to move laterally of the longitudinal member and being interposed between said member and the hollow body, a yieldable fluid confining wall interposed between said rigid member and said pressure plate, said yieldable fluid confining wall having inherent stability tending to resist movement of the pressure plate from a plane parallel to the longitudinal axis of the longitudinal member, a pair of engaging members carried by the rigid hollow member at spaced points on diametrically opposite sides thereof, a third engaging member carried by the pressure plate and engaging the longitudinal member at a point intermediate the points of contact with the pair of engaging members on the rigid hollow member, whereby variation in tension in the longitudinal member will be transmitted through the pressure plate to the fluid confined within the hollow member, and centering means for the pressure plate carried by the hollow member and adapted to center the pressure plate while permitting it to move laterally of the longitudinal member under its varying tension.

17. A device for measuring tension in a cable or the like, comprising a rigid body having spaced cable contacts thereon and including a compartment for the reception of a pressure fluid, a yieldable fluid confining member carried by said body, a pressure plate substantially covering said yieldable fluid confining member and adapted to act thereagainst to deflect the member and exert pressure on the confined fluid, a cable contact carried by said plate and engaging the cable intermediate the spaced cable contacts carried by the body and upon the opposite side therefrom, said yieldable fluid confining member having inherent stability to resiliently resist movement of said pressure plate independently of the pressure of the confined fluid.

18. A device for measuring tension in a cable or the like, comprising a rigid body having spaced cable contacts thereon and including a compartment for the reception of a pressure fluid, a yieldable fluid confining member carried by said body, a pressure plate substantially covering said yieldable fluid confining member and adapted to act thereagainst to deflect the member and exert pressure on the confined fluid, a cable contact carried by said plate and engaging the cable intermediate the spaced cable contacts carried by the body and upon the opposite side therefrom, and means associated with one of the spaced cable engaging members carried by the body adapted for adjustably clamping said body to the cable for the support of said weight indicator, the other of said rope engaging means being arranged to allow free transmission of stress thereby.

19. A device for measuring tension in a cable, or the like, comprising a rigid body having spaced cable contacts thereon and including a compartment for the reception of a pressure fluid, a rigid pressure plate disposed adjacent the open side of said body and adapted to reciprocate with relation thereto, a cable contact carried centrally of said plate and engaging the cable at a point midway between the cable contacts, deformable means for confining a pressure fluid within the compartment formed by the rigid body and the pressure plate, and a gauge actuated by said pressure fluid to indicate variation in tension of the cable, and a relatively short bearing member for limiting lateral movement of the pressure plate characterized by being interposed between the cable and the pressure receiving surface of the deformable fluid confining member.

20. A tension indicator including a rigid body, a spaced pair of cable engaging members connected thereto, a third contact member adapted to engage the cable intermediate the points of engagement of said first named cable engaging members, said body having an open sided recess formed therein, a flexible fluid confining member extending across such recess, a presser plate actuated by said third contact member, a pressure indicating gauge in communication with such recess, said flexible fluid containing member being constricted by said body and presser plate and having sufficient stability to effectively resist tilting of said presser plate, said presser plate and said body forming a substantially complete rigid enclosure for fluid and adapted to resist extension of said flexible fluid confining member.

In testimony whereof I affix my signature.

WALTER R. MARTIN.